United States Patent Office 3,733,313
Patented May 15, 1973

3,733,313
HALOHYDRIN SYNTHESIS
Arnold N. Johnson, Wayne, and Walter Nudenberg, West Caldwell, N.J., assignors to Uniroyal, Inc., New York, N.Y.
No Drawing. Filed Mar. 4, 1970, Ser. No. 16,607
Int. Cl. C07c 29/00; C08f 15/40
U.S. Cl. 260—80.78                                      12 Claims

ABSTRACT OF THE DISCLOSURE

Halohydrins (especially chloro- and bromo-hydrins) are prepared from olefins having a double bond not activated by an adjacent aromatic radical, by reaction with a dilute solution of hydrogen peroxide and the corresponding aqueous hydrogen halide. Examples of starting olefins are cyclohexene, butadiene, and polybutadiene, to make, respectively, 2-halocyclohexanol, the three isomeric dihalobutanediols, and poly (3-halo-2-hydroxytetramethylene). Halohydrin of EPDM rubber may be prepared by the process. The EPDM halohydrin can be cured by the action of diisocyanates or other reagents.

BACKGROUND OF THE INVENTION (1) Field of the invention

This invention relates to a method of making halohydrins, and to halohydrins of polymers containing olefinic unsaturation.

(2) Description of the prior art

British Pat. 746,042, N.V. Polak & Schwarz's Essencefabrieken, published Mar. 7, 1956, discloses preparation of a halohydrin from styrene by reaction with a solution of hydrogen peroxide and aqueous hydrogen halide. The present invention employs olefins in which, unlike styrene, the olefinic double bond is not activated by an adjacent aromatic group.

Previously, it has been suggested to prepare 2-bromocyclohexanol by reacting cyclohexene with N-bromosuccinimide in water [C. O. Guss, J. Am. Chem. Soc., 77, 2549 (1955)], but unfortunately that method has certain disadvantages, notably the high cost of N-bromosuccinimide, and undesirable waste represented by succinimide as a byproduct, which if not removed will act as a contaminant.

SUMMARY OF THE INVENTION

In accordance with the invention, useful halohydrins, particularly chlorohydrins and bromohydrins for example, are readily prepared in good yields by a novel route involving reaction of olefins, including monoolefins, diolefins, and olefinically unsaturated polymers, wherein the olefinic double bond is not aromatically activated, that is, there is no aromatic group adjacent to the double bond, with a dilute solution of hydrogen peroxide and the corresponding aqueous hydrogen halide.

Preferred olefins employed in the invention are selected from the group consisting of (A) and (B), the said (A) having the formula

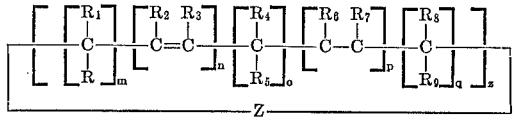

where the R's are the same or different and are selected from hydrogen and lower alkyls (having, for example, from 1 to about 5 carbon atoms), Z is selected from zero and the diradical $SO_2$ when the olefin is cyclic and from 2(H) and 2(OH) when the olefin is acyclic, z is from 1 to 5,000, m is from zero to 10, n is from 1 to 4, o is from zero to 8, p is from zero to 4, and q is from zero to 4,
and the said (B) being a copolymer of at least one alpha-monoolefin with at least one copolymerizable polyene.

It will be noted that the olefinic substances which are converted to halohydrins by the method of the invention include not only substances with one olefinic bond, but also substances with more than one olefinic bond (whether conjugated or non-conjugated); the substances may be monomeric or polymeric. Open chain olefins such as ethylene, propylene, octene-1, dodecene, etc., may be used. A useful sub-class is represented by the cyclic monoolefins having from 5 to 20 carbon atoms, such as cyclopentene, cyclohexene, cyclooctene, cyclododecene, etc. Another useful sub-class is represented by the dienes, especially the conjugated or non-conjugated diolefins having 4 to 20 carbon atoms, whether open chain as in butadiene-1,3, isopene, 2,3-dimethylbutadiene, piperylene, etc., or cyclic as in 1,3-cyclooctadiene, 1,5-cyclooctadiene, cyclopentadiene, etc., including polymers thereof as in polybutadiene, polyisoprene, etc. Equivalent to the foregoing are various substituted forms, such as sulfones and diols.

Particularly useful chemicals are cyclohexene, cyclopentene, cyclooctene, cyclododecene, butadiene-1,3-butadiene-1,3-sulfone, butadiene-1,3-isosulfone, polybutadiene, polybutadienediol, isoprene, isoprene sulfone, isoprene isosulfone, polyisoprene, 2,3-dimethylbutadiene, piperylene, piperylene sulfone, piperylene isosulfone, 1,5-cyclooctadiene, and 1,3-cyclooctadiene. These and similar olefins yield, by the method of the invention, such products as 2-halocyclohexanol (predominantly trans),
2-halocyclopentanol,
2-halocyclooctanol,
2-halocyclododecanol,
2,4-dihalo-1,3-butanediol,
3,4-dihalo-1,2-butanediol,
1,4-dihalo-2,3-butanediol,
3-halo-tetrahydro-1,1-dioxothiophene-3-ol,
poly(2-halo-3-hydroxytetramethylene),
poly(2-halo-3-hydroxytetramethylene)-alpha,omega-diol,
4-halo-3-methyl-2-buten-1-ol,
1-halo-3-methyl-3-buten-2-ol,
1-halo-2-methyl-3-buten-2-ol,
4-halotetrahydro-4-methyl-1,1-dioxothiophenol,
4-halotetrahydro-3-methyl-1,1-dioxothiophene-3-ol,
2-halotetrahydro-3-methyl-1,1-dioxothiophene-3-ol,
poly(2-methyl-3-hydroxy-2-halotetramethylene),
4-halo-2,3-dimethyl-2-buten-1-ol,
2-halo-2,3-dimethyl-3-buten-1-ol,
4-halo-3-penten-2-ol,
1-halo-3-penten-2-ol,
4-halo-1-penten-3-ol,
3-halo-4-penten-2-ol,
4-halotetrahydro-5-methyl-1,1-dioxothiophene-3-ol,
4-halotetrahydro-2-methyl-1,1-dioxothiophene-3-ol,
2-halotetrahydro-2-methyl-1,1-dioxothiophene-3-ol,
8-halo-4-cycloocten-1-ol,
5,8-dihalo-1,6-cyclooctandiol,
2,6-dihalo-1,5-cyclooctandiol,
2-halo-3-cycloocten-1-ol,
4-halo-2-cycloocten-1-ol,
2,3-dihalo-1,4-cyclooctandiol,
3,4-dihalo-1,2-cyclooctandiol, and
2,4-dihalo-1,3-cyclooctandiol.

It will be manifest that reaction of one equivalent of a diene with one equivalent of hydrogen halide and one equivalent of hydrogen peroxide will result in formation of an unsaturated halohydrin. The unsaturated product can be converted by halogen to trihaloalkanol, while reaction with more hydrogen halide and hydrogen peroxide (an equivalent of each) will result in the formation of a dihaloalkandiol.

In the form of the invention in which the starting olefinic compound is (B), that is, a copolymer of at least one alpha-monoolefin with at least one copolymerizable polyene (e.g., ethylene-dicyclopentadiene copolymer), it is preferred to employ a copolymer of at least two different alpha-monoolefins with at least one copolymerizable polyene. One of the alpha-monoolefins is ordinarily ethylene while the other is usually propylene. However, other pairs of alpha-monoolefins, such as ethylene and butene-1, or propylene and butene-1, may also be used. The polyene is ordinarily a diene, usually a non-conjugated diene, whether open chain as in hexadiene-1,4 or cyclic as in such bridged ring hydrocarbons as dicyclopentadiene, methylene norbornene, ethylidene norbornene (see, for example, U.S. Pat. 3,419,639, Dec. 31, 1968, Gentile, and the references cited therein). Rubbery terpolymers of this kind are usually called "EPDM." It will be understood that in such copolymers the main polymer chain is saturated, but there are side branches, each representing a residue of a diene molecule, which have olefinic unsaturation.

It is preferred to carry out the reaction of the olefinic compound with the hydrogen halide and the hydrogen peroxide in the presence of a diluent. Water is a preferred medium for the reaction. The reaction is exothermic; the diluent aids in dissipating the heat evolved and prevents local high concentrations of reactants. A preferred practice involves concurrent addition of the reactants to a reaction vessel over a period of time. Regulation of the rate of addition of reagents assists in controlling the temperature of the reaction mixture. Evidence of reaction can usually be noted by formation of an oily layer containing the halohydrin at the bottom of the reaction vessel. Typically, the insoluble starting unreacted olefin is initially observed as a top organic layer.

The concentration of reactants may be adjusted to produce an initial aqueous phase containing usually at least 0.1% aqueous hydrogen halide, up to for example, about 32% aqueous hydrogen halide. The initial concentration of hydrogen peroxide in the aqueous phase is usually at least 0.1% up to for example about 20%. As the reaction proceeds the concentrations of reagents drop, to nearly zero if equimolar quantities of reactants are employed.

In the case of chlorohydrin formation, the initial concentrations are frequently about 0.1 to 25% aqueous hydrochloric acid, preferably 3 to 14%, and 0.1 to 20% aqueous hydrogen peroxide, preferably about 3 to 10%.

In the case of bromohydrin formation, there is some tendency for the aqueous hydrobromic acid to promote conversion of the hypobromous acid to free bromine, which in turn will form the corresponding dibromide adduct. With hydrochloric acid, however, this side reaction does not occur. This side reaction can be minimized by avoiding excessive quantities of hydrobromic acid. Usually the concentration of aqueous hydrobromic acid is initially adjusted to 0.1 to 32%, preferably about 8 to 20%, and the accompanying concentration of hydrogen peroxide is 0.1 to 14%, preferably about 3 to 8%.

The reaction temperature may vary widely, for example, from about 0° C. up to about 100° C., or higher with the use of pressure apparatus. The preferred temperature range is 75–100° C. In making bromohydrins, for chlorohydrin formation the preferred reaction temperature range is 75–100° C. In making bomohydrins, higher temperatures decrease dibromide formation. In making chlorohydrins, dichloride formation is low and the reaction rate is slow below about 80° C.

In many cases the initial reaction mixture comprises simply the starting olefin, the reagents, and water without any other solvent, particularly when the starting olefin is a liquid under the conditions of temperature and pressure at which the reaction is carried out. However, the reaction mixture may also include an organic solvent, such as an inert organic solvent in which the starting olefin is soluble. Thus, a starting olefin which is a gas or a solid may be dissolved in a conventional organic solvent, for treatment with the aqueous reagents.

The halohydrins produced by the method of the invention are useful for various purposes. By elimination of hydrogen halide from the products useful epoxides may be formed. Typically the halohydrins react readily with bases at room temperature to yield useful oxides which in turn are of interest for ring opening reactions and polymerizations. The halohydrins can undergo displacement reactions involving the halo groups to yield useful products containing —SCN, —CNO, —CN, —COOH, acetates, etc. The halohydrins may undergo reactions involving reactive —OH groups by reactions with isocyanates, acids, etc.

The halohydrins of polymers containing olefinic unsaturation (e.g. polybutadiene halohydrin, EPDM halohydrin) are especially useful novel products of the invention. They may be cured or cross-linked reactive polyfunctional agents. Thus, the EPDM halohydrin of Example VI may be cured to form useful shaped elastomers by the action of an organic diisocyanate, for example by mixing 100 parts of the EPDM halohydrin with 3 parts by weight of diphenylmethane diisocyanate and heating the mixture in a mold having the shape of a gasket at 250° F. for 15 minutes, to form a gasket. Any organic diisocyanate may be used, such as for example those disclosed in U.S. Pat. 2,981,719, Muhlhausen et al., Apr. 25, 1961, col. 4, 1. 13–21.

The process of the present invention is advantageous from an economic standpoint because it is possible to use, in the process, low-cost by-product dilute aqueous solutions of hydrogen halide which are at present a glut on the market. It is possible to perform the present method as a batch-type process to quantitative yields.

DESCRIPTION OF THE PREFERRED EMBODIMENTS

The following examples will serve to illustrate the practice of the invention in more detail.

EXAMPLE I

This example illustrates the preparation of 2-chlorocyclohexanol from the olefin, cyclohexene, by the method of the invention, and the conversion of the 2-chlorocyclohexanol to cyclohexene oxide.

In a 3-l., 3-necked flask equipped with stirrer were placed 500 ml. of water, 129.5 g. (1.22 moles) of 32% aqueous hydrogen peroxide, 117.7 g. (1.23 moles) of concentrated 38% aqueous hydrochloric acid, and 70.29 g. (.85 mole) of cyclohexene. The temperature of the mixture was raised to 86–90° C. where vigorous refluxing occurred. Additional reactants were added for a total of 139.6 g. (1.32 moles) of hydrogen peroxide, 155.7 g. (1.61 moles) of hydrochloric acid and 103.3 g. (1.26 moles) of cyclohexene. On continued heating (3 hrs.) the organic layer became more dense than the aqueous layer. Titration of an aliquot of the aqueous layer with 0.1 normal ceric sulfate showed 0.18 mole of unreacted hydrogen peroxide. Agitation for 6 hours at 85° C. caused a further decrease in unreacted hydrogen peroxide to .092 mole. After overnight agitation at room temperature, titrations showed the presence of .036 mole of hydrogen peroxide and .38 mole of unreacted hydrogen chloride. These values correspond to the consumption of 1.28 moles of hydrogen peroxide and 1.23 moles of hydrochloric acid. The crude chlorohydrin (122 g., 73%) was separated as a yellow oil (density 1.12) and then washed successively with water, 5% aqueous sodium bicarbonate and water. The washed and dried product weighed 109 g.

Treatment of a 49.3 aliquot with 106 g. of 15.8% aqueous sodium hydroxide by agitation at room temperature gave 30.5 g. (99%) of crude cyclohexene oxide, density 0.99. Analysis by vapor phase chromatography showed the presence of 86% cyclohexene oxide and 12.4% cis-2-chlorocyclohexanol. This corresponds to a 70% yield of cyclohexene oxide based on the starting cyclohexene. Distillation of a 31.8 g. aliquot of crude oxide in a 12-inch column gave 21.6 g. of cyclohexene oxide boiling at 127–130° (99% purity by vapor phase chromatography). An additional 6.29 g. cyclohexene oxide was recovered by vacuum distillation of the residue. All fractions were free of trans 2-chlorocyclohexanol as measured by vapor phase chromatography. The crude chlorohydrin before caustic treatment by vapor phase chromatography analysis contained 5.6% unreacted cyclohexene, 3.5% cyclohexene oxide, and 11.3% cis 2-chlorocyclohexanol, and 78.7% trans 2-chlorocyclohexanol.

Distillation of 50.4 g. of crude chlorohydrin gave 32.2 g. 2-chlorocyclohexanol, B.P. 66–67°/3–4 mm., $n_D^{21}$ 1.4873 to 1.4881. The first cuts were higher in cis by vapor phase chromatography while the last two-thirds of distillate contained about 90% trans. The residue of 4.8 g. (9%) was judged to be essentially chlorocyclohexanol by its refractive index of 1.4896 at 21° C.

EXAMPLE II

This example illustrates making 2-bromocyclohexanol from cyclohexene.

A 3-l. flask containing 600 ml. of water and 159.5 g. (1.50 moles) of 32% aqueous hydrogen peroxide was heated at 60° C. while adding 123.2 g. (1.50 moles) of cyclohexene and 271 g. (1.61 moles) of 48% aqueous hydrobromic acid over a period of one hour. The temperature rose to 73° C. with the bath at 57° C. A bottom oil was evident after addition of 50% of the reactants. The solution was agitated for 1.5 hours at 60° C. and then for four hours without further heating of the bath. The aqueous layer contained .05 mole each of unreacted hydrogen peroxide and hydrobromic acid as measured by titration with 0.1 normal ceric sulfate and 0.1 normal sodium hydroxide respectively. The bottom organic oil of 222 g. and 1.46 gravity was washed with 200 ml. at 5% aqueous ferrous sulphate, 200 ml. of water and 200 ml. of 5% aqueous sodium bicarbonate and 200 ml. of water. Distillation of a 68.5% aliquot gave 121.3 g. (68%) 2-bromocyclohexanol with a center cut, B.P. 620 (0.5 mm.), $n_D^{21}$ 1.5239, and $d^{29}$ 1.5137. Guss [J.A.C.S. 77, 2549 (1955)] reports 2-bromocyclohexanol, $n_D^{20}$ 1.5180, in 79% yield by the use of 2-bromosuccinimide. The present sample was judged to contain about 20% of dibromide as impurity by density and elemental analysis.
Calcd.:
for $C_6H_{10}Br_2$ (percent): C, 41.3; H, 3.50; Br. 55.2
for $C_6H_{11}BrO$ (percent): C, 40.3; H, 6.16; Br, 44.8; O, 8.92. Found (percent): C, 38.14; H, 5.64; Br, 51.13; O, 7.70.

The IR spectrum showed an OH peak at 3500 cm.$^{-1}$.

EXAMPLE III

This example illustrates the use of an olefin which is a diene, and involves preparation of 5,8-dibromo-1,6-cyclooctandiol and 2,6-dibromo-1,5-cyclooctandiol by first preparing from 1,5-cyclooctandiene the 8-bromo-4-cycloocten-1-ol and then converting the said bromohydrin into the two isomeric dibromodiols.

A 3 liter flask containing 600 ml. of water at 60° C. was agitated with concurrent addition over 3¼ hours of 162.2 g. (1.5 moles) of 1,5-cyclooctadiene, 159 g. (1.5 moles) of 32% aqueous hydrogen peroxide and 271 g. (1.61 moles) of 40% aqueous hydrobromic acid. After two hours of reaction at 60° C. titaration of the top aqueous layer indicated nearly quantitative reaction of the hydrogen peroxide and hydrobromic acid to form a bottom oily layer of crude 8-bromo-4-cycloocten-1-ol. This crude halohydrin was not isolated but was further converted to the two isomeric dibromohydrins, namely 5,8-dibromo-1,6-cyclooctandiol and 2,6-dibromo-1,5-cyclooctandiol. This conversion was done by adding to the reaction mixture 159 g. (1.5 moles) of 32% aqueous hydrogen peroxide and 271 g. (1.61 moles) of 48% aqueous hydrobromic acid over a two hour period. Analysis of the top aqueous layer via titration indicated the presence of 0.015 mole of unreacted hydrogen peroxide and 0.02 mole of unreacted hydrobromic acid. The reaction mixture was agitated overnight at room temperature, and the bottom oily layer, weighing 376 g. with a density of 1.76 was separated from the aqueous layer, washed with 250 ml. of ferrous sulfate and finally with 200 ml. of water.

A 108 g. aliquot of the crude dibromohydrins was distilled under reduced pressure (2.1 mm.). A center cut with a boiling point of 130°–131° C., $n_D^{26}$ 1.557, $d^{25}$ 1.751 was found to contain 55.97% bromine and 5.31% of oxygen as against theory of 52.9% bromine and 10.6% oxygen for the expected dibromohydrins. The presence of hydroxyl was established by infrared absorption at 3500 cm.$^{-1}$.

EXAMPLE IV

In this example the olefin is employed in a substituted form, namely, as a sulfone.

A 3-liter flask containing a complete solution of 600 ml. water and 177 g. (1.50 moles) butadiene sulfone, specifically 2,5-dihydrothiophene-1,1-dioxide (66–68° M.P.) was agitated at 55–65° C. while adding over 1.25 hours a feed of 159.5 g. (1.50 moles) 32% aqueous hydrogen peroxide and 217 g. (1.61 moles) 48% hydrobromic acid. Solids separated and titration indicated 0.405 mole unreacted hydrogen peroxide and .083 mole hydrobromic acid. Additional hydrobromic acid 72.1 g. (.427 mole) was accordingly added over 20 minutes. Further reaction was slow during the next 17 hours of which the first two were at 60° C. followed by four hours of agitation at room temperature.

| Hours after additions | Temp., °C. | Moles hydrogen peroxide | Unreacted hydrobromic acid |
|---|---|---|---|
| 0.33 | 60 | .173 | .20 |
| 0.80 | 60 | .105 | .121 |
| 1.33 | 58 | .098 | .112 |
| 1.75 | 59 | .082 | .082 |
| 17.0 | 25 | .035 | .069 |

The slurry was filtered to give 309 g. crude solid 3-bromotetrahydro-1,1-dioxothiophene-3-ol with 3,4-dibromotetrahydrothiophene-1,1 dioxide as a major impurity.

An aliquot portion of 274 g. of water-insoluble fraction was heated with 2000 ml. boiling benzene and filtered. The insoluble material was heated with 300 ml. xylene at about 80° C., filtered, washed with benzene, and dried to give 50.0 g. (15.6%) of 3-bromotetrahydro-1,1-dioxothiophene-3-ol, M.P. 190–192° C. The material gave a strong infrared OH peak at 3500 cm.$^{-1}$. [Backer (Rec. des. Trav. Chim. 67, 451 1948) prepared 2-bromotetrahydro-1,1-dioxothiophene-3-ol by the action of N-bromosuccinimide on 2,5-dihydrothiophene-1,1-dioxide in wet acetone and reported a melting point of 190°–1° C.]

EXAMPLE V

This example demonstrates the use of gaseous butadiene to produce 2,4-dibromo-1,3-butanediol and 1,4-dibromo-2,3-butanediol along with some formation of 3,4-dibromo-1,2-butanediol. The 2,4 and 1,4 dibromohydrins are produced from the monobromohydrins, 4-bromo-2-buten-1-ol and 4-bromo-1-buten-3-ol which are formed as intermediary products.

A major by-product and impurity are the tribromobutanols which form because of the high concentration of hydrogen peroxide and hydrobromic acid which generate some free bromine and which reacts (add across the double bond) with the two isometric monobromobuteneols.

The reaction was carried out by charging a 2-liter 3-necked flask with agitator with 1700 ml. water, and heated to 55–60° C. Little reaction was noted on addition of the following reactants over a period of 20 minutes without the use of a reflux condenser: 108 g. (0.64 mole) 48% aqueous hydrobromic acid, 58.5 g. (0.55 mole) 32% aqueous hydrogen peroxide (3.30 moles), and 79.5 g. (1.47 m.) vaporized butadiene. An additional 178 g. (3.30 moles) of butadiene was then added as a vapor over 2.75 hours. The presence of an oily layer on the bottom of the flask indicated that the desired reaction had occurred. Further reactants were added for a total of 274.5 g. (1.63 moles) hydrobromic acid, 176 g. (1.65 moles) hydrogen peroxide and 257.5 g. (4.77 moles) gaseous butadiene. The reaction mixture was allowed to settle at room temperature for separation of a bottom oil which was found to be essentially a 1:1 mixture of 1,2,3,4 tetrabromobutane and tribromobutanol weighing 31.0 g. after two water washings.

The major reaction products were recovered by extracting the aqueous layer with five 500 ml. portions of chloroform. Evaporation under reduced pressure (0.05 mm.) and 25° C. yielded 30.5 g. brown oil which was found to be a 3:1 mixture of tribromobutanol and the desired 2,4-dibromo-1,3-butanediol and 1,4-dibromo-2,3-butanediol and some 3,4-dibromo-1,2-butanediol. A 27.9 g. aliquot was distilled in a micro distilling column to yield a main cut of 19.7 g., B.P. 95–99°/0.8 mm. Redistillation yielded 13.8 g., B.P. 98–98°/0.7 mm. and $n^{20}$ 1.5830 plus 2.4 g. forerun, B.P. 90–96°/0.7 mm. and $n^{20}$ 1.5555. Analysis of the main cut indicated the formation of 25% of the desired dibromohydrins and 75% of 1,3,4-tribromo-2-butanol and 2,3,4-tribromo-1-butanol.

Theory for—
$C_4H_6OHBr_3$ (percent): C, 15.4; H, 2.25; O, 5.15; Br, 77.2
$C_4H_6(OH)_2Br_2$ (percent): C, 19.4; H, 3.20; O, 12.9; Br, 64.5
Found for Main Cut (percent): C, 16.4; H, 2.70; O, 6.78; Br, 74.06

Infra-red absorption indicated OH peaks at 3500 as well as 1060 and 1080 cm.$^{-1}$.

EXAMPLE VI

In this example the olefin employed is in the form of a polymer, namely an EPDM rubber which is a terpolymer of ethylene (about 55 wt. percent), propylene (about 37 wt. percent), and dicyclopentadiene (about 8 wt. percent), iodine number 17.5. It will be understood that in such a terpolymer the polymer chain is saturated, but each dicyclopentadiene residue in the polymer provides a side chain with one residual olefinic bond. The EPDM has a relatively low molecular weight, intrinsic viscosity 0.41 in Tetralin at 135° C.

40 g. of the EPDM (0.0138 mole unsaturation) was dissolved in 769 g. chloroform. The material was heated to 60° C. with 200 ml. water and 21.9 g. (.208 mole) 32% aqueous hydrogen peroxide followed by addition of 22.3 g. (.132 mole) 48% aqueous hydrobromic acid over a period of 30 minutes. An orange color of bromine was evident. Titration of the aqueous layer showed the presence of .023 mole unreacted hydrogen peroxide after one hour and .075 mole unreacted hydrobromic acid. After agitation overnight at room temperature, the chloroform layer showed no gelling. It was washed with 200 ml. of 5% sodium bisulfite, 200 ml. of 2% aqueous sodium hydroxide, and 200 ml. of water before precipitation with methanol. Drying at a reduced pressure of 0.1 mm. gave 40.6 g. sticky polymer with an iodine number of 2.0. Analysis showed it to contain 0.31% moisture, 2.50% oxygen and 8.64% bromine. The 2.28% net combined oxygen corresponds to 1.3 combined oxygen atoms per 1.0 bromine atoms. (The change in iodine number from 17.5 to 2.0 indicates substantial reaction of the unsaturated molecule to bromohydrin with little dibromide formation.) The material can be treated with base for conversion to epoxides for ring opening polymerizations.

EXAMPLE VII

In this example the EPDM employed contains 53% ethylene, 34% propylene, 11% dicyclopentadiene, iodine number, 22; intrinsic viscosity in Tetralin at 135° C., 2.23.

8.0 g. of the EPDM (0.0069 mole unsaturation) is used in 700 ml. chloroform at room temperature with addition of 50 ml. water followed by concurrent addition over 15 minutes of 2.4 g. (0.228 mole) 32% aqueous hydrogen peroxide in 50 ml. water, 3.8 g. (.0228 mole) of 48% aqueous hydrobromic acid in 50 ml. water. After overnight agitation, a gelled portion of 0.3 g. (4%) was separated. The clean chloroform solution (after addition of 0.1 g. antioxidant [e.g. acetone-diphenylamine condensation product]) may be precipitated in methanol and vacuum dried to give 7.2 white solid of 7.0 iodine number. Elemental analysis showed 8.0% bromine and 0.84% oxygen, corresponding to 1.94 bromine atoms per 1.00 oxygen atom.

EXAMPLE VIII

Practice of the invention with an olefin in the form of a substituted polymer is illustrated in this example. The substituted polymer is polybutadienediol with a molecular weight of 2340 made by the procedure of Example I in British Pat. No. 957,788. A one liter three-neck flask was charged with 52.7 g. (0.67 m. unsaturation) of the polybutadienediol, 482 g. benzene, and 250 ml. water. Over a period of ten minutes at 28–31° C. were added 50.5 g. (0.30 mole) 48% aqueous hydrobromic acid and 26.8 g. (0.252 mole) 32% aqueous hydrogen peroxide. After 1.5 hours of agitation titration showed the presence of 0.11 m. unreacted hydrogen peroxide. The reaction mixture was agitated with 25.0 g. (0.127 mole) sodium thiosulfate in 170 ml. water and then 45.0 g. (1.07 moles) 95% sodium hydroxide in 150 ml. water. After overnight agitation at room temperature, the thick emulsified solution was heated for 4 hours at 70° C. and for 2 hours at 90°–100° C. for removal of benzene.

A 81.7 g. aliquot (22%) of reaction mixture was pumped overnight under a reduced pressure of 0.5 mm. to yield 56.3 g. creamy emulsion. A 48 g. aliquot was heated with boiling toluene to yield a bottom organic layer of 612 g. containing 2.1% solids, corresponding to 68.9 g. for the whole run. The dried product was a sticky solid containing 2.68% oxygen and 17.48% bromine, corresponding to about 13% saturation of the available double bonds. The infra-red spectrum showed an OH peak at 3500 cm.$^{-1}$.

EXAMPLE IX

In a run similar to Example VIII, 882 g. of cyclohexane was used as a solvent for 52.7 g. of the same polybutadienediol and similar quantities of reactants plus 300 ml. of water with overnight agitation. Titration of the emulsion indicated only 0.025 m. unreacted hydrogen peroxide and .0101 m. unreacted hydrobromic acid for a consumption of 0.22 mole of hydrogen peroxide and 0.29 mole of hydrobromic acid per 0.97 mole of unsaturated polymer. The reaction product was dried to yield 44.6 g. of a brown solid polymer. Elemental analysis of this brown solid polymer showed:

| | Percent |
|---|---|
| C | 56.27 |
| H | 7.15 |
| O | 9.46 |
| Br | 21.31 |
| Total | 94.19 |

$C_4H_{6.1}O_{.51}Br_{.23}$; Mole ratio Br/O, 0.35

The bromine content of the polymer indicated about 23% reaction of the available unsaturation as against 30% calculated on consumption of input hydrogen bromide. Appreciable oxygen was also incorporated.

EXAMPLE X

A 5-liter 3-necked flask was charged with 750 ml. water and heated at 90°–93° C. with dropwise addition over 65 minutes of 699 g. of a solution of cis-polybutadiene (0.65 mole unsaturation) in xylene, 89.6 g. (.848 m.) 32% aqueous hydrogen peroxide, and 79.2 g. (.825 m.) 38% aqueous hydrochloric acid. The characteristics of the starting cis-BR were: 95% of the unsaturated bonds were of cis configuration; Mooney viscosity (ML–4 at 212° F.), 40–50; inherent viscosity, 2.6; essentially gel-free.

The milky solution was agitated for there additional hours at 90°–93° C. and diluted with methanol to fill a 4-l. beaker. Aliquots were further agitated with methanol in a large Waring Blendor to give four fractions of methanol showing the presence of a total of .042 mole unreacted hydrogen peroxide and .472 m. unreacted hydrochloric acid. (This corresponds to consumption of 0.80 mole hydrogen peroxide and 0.343 mole hydrochloric acid for 0.65 mole of cis-BR.) The reaction product was precipitated by dilution with methanol and then vacuum dried to yield 25.6 g. of a pale tan rubbery polymer. A 14.2 g. aliquot was agitated with chloroform to give a clear solution of 1% concentration. The polymer was precipitated from the solution by the addition of three volumes of methanol containing 0.5 g. of beta-phenylnaphthylamine (PBNA) in a Waring Blendor. The precipitated polymer was vacuum dried to yield 2.2 g. of a brown sticky rubber. The turbid methanol solution was acidified with 0.5 ml. of concentrated aqueous hydrochloric acid to yield 2.5 g. of additional rubber with substantially the same chlorine and oxygen content, as follows:

Percent chlorine=7.11; percent oxygen=1.48

The ratio of chlorine atoms to oxygen atoms was 2.2, representing a reaction of 5% of the available unsaturation in the starting polybutadiene polymer. The glass transition temperature of the modified polybutadiene polymer was −92° C.

In another run, the reaction was carried out with 35.9 g. (0.665 mole unsaturation) cis-polybutadiene dissolved in 802 g. of heptane. The heptane solution was added dropwise to 500 ml. of water at 80° C., while concurrently adding 79.2 g. (0.838 mole) of 38% aqueous hydrochloric acid and 89.5 g. (0.840 mole) of 32% aqueous hydrogen peroxide over a period of three hours with agitation. After settling overnight the top organic layer of reaction product was precipitated with methanol and vacuum dried to yield 30.0 g. of rubbery polymer that had a glass transition temperature of −108° C. The polymer reaction product was purified by dissolving in chloroform, precipitating with methanol and vacuum drying. Analysis of the purified rubbery product showed it to contain 8.42% chlorine and 4.37% oxygen. The ratio of oxygen atoms to chlorine atoms was 1.1 indicating the formation of the chlorohydrin. The chlorohydrin from both runs showed the presence of hydroxyl groups at 3500 cm.$^{-1}$ by infra-red analysis.

Having thus described our invention, what we claim and desire to protect by Letters Patent is:

1. A method of making halohydrins comprising mixing together (a), (b) and (c),
    the said (a) being an olefinic substance having a double bond not activated by an adjacent aromatic radical, selected from the group consisting of
        (I) a cyclic monoolefin hydrocarbon having from 5 to 20 carbon atoms,
        (II) a diolefin hydrocarbon having from 4 to 20 carbon atoms,
        (III) an ethylene-propylene-non-conjugated diene terpolymer rubber,
        (IV) a conjugated diolefin hydrocarbon polymer,
        (V) a sulfone of (II), and
        (VI) a diol of (IV),
    the said (b) being aqueous hydrogen peroxide,
    the said (c) being aqueous hydrogen chloride or bromide,
the concentration of hydrogen peroxide in the aqueous phase being from 0.1 to 20% by weight and the concentration of hydrogen chloride or bromide in the aqueous phase being from 0.1 to 32% by weight, the mixture being subjected to a temperature of from 0° to 100° C., whereby the chlorohydrin or bromohydrin of said olefinic substance (a) is formed.

2. A method as in claim 1 in which (c) is aqueous hydrogen chloride, the concentration of hydrogen chloride in the aqueous medium is from 0.1 to 25% by weight, and the reaction mixture is subjected to a temperature of 75° to 100° C.

3. A method as in claim 1 in which (c) is aqueous hydrogen chloride, the concentration of hydrogen chloride in the aqueous medium is from 3 to 14% by weight, the concentration of hydrogen peroxide in the aqueous medium is from 3 to 10%, and the reaction mixture is subjected to a temperature of 75° to 100° C.

4. A method as in claim 1 in which (c) is aqueous hydrogen bromide, and the concentration of hydrogen peroxide in the aqueous medium is from 0.1 to 14%.

5. A method as in claim 1 in which (c) is aqueous hydrogen bromide, the concentration of hydrogen bromide in the aqueous medium is from 8 to 20%, and the concentration of hydrogen peroxide in the aqueous medium is from 3 to 8%.

6. A method of making a halohydrin comprising mixing together (a), (b) and (c),
    the said (a) being a cyclic monoolefin having from 5 to 20 carbon atoms,
    the said (b) being aqueous hydrogen peroxide,
    the said (c) being aqueous hydrogen chloride or bromide,
the concentration of hydrogen peroxide in the aqueous phase being from 0.1 to 20% by weight and the concentration of hydrogen chloride or bromide in the aqueous phase being from 0.1 to 32% by weight, the mixture being subjected to a temperature of from 0° to 100° C., whereby the chlorohydrin or bromohydrin of said olefinic substance (a) is formed.

7. A method as in claim 6 in which (c) is aqueous hydrogen chloride, the concentration of hydrogen chloride in the aqueous medium is from 0.1 to 25% by weight, and the reaction mixture is subjected to a temperature of 75° to 100° C.

8. A method as in claim 6 in which (c) is aqueous hydrogen chloride, the concentration of hydrogen chloride in the aqueous medium is from 3 to 14% by weight, the concentration of hydrogen peroxide in the aqueous medium is from 3 to 10%, and the reaction mixture is subjected to a temperature of 75° to 100° C.

9. A method as in claim 6 in which (c) is aqueous hydrogen bromide, and the concentration of hydrogen peroxide in the aqueous medium is from 0.1 to 14%.

10. A method as in claim 6 in which (c) is aqueous hydrogen bromide, the concentration of hydrogen bromide in the aqueous medium is from 8 to 20%, and the concentration of hydrogen peroxide in the aqueous medium is from 3 to 8%.

11. A method as in claim 8 in which the olefinic material (a) is cyclohexene.

12. A method as in claim 10 in which the olefinic material (a) is cyclohexene.

(References on following page)

References Cited

UNITED STATES PATENTS

| | | | | |
|---|---|---|---|---|
| 2,307,875 | 1/1943 | Buc | 260— | 634 |
| 2,856,417 | 10/1958 | Wijga | 260— | 408 |
| 3,093,690 | 6/1963 | Moss | 260— | 634 |
| 3,277,189 | 10/1966 | Bromberg | 260— | 634 |
| 3,317,479 | 5/1967 | Noshay | 260— | 77.5 |
| 3,598,874 | 8/1971 | Kloss | 260— | 634 |

OTHER REFERENCES

Thorpe's Dictionary of Applied Chemistry, Fourth Ed., vol. VI, 1944, Longmans, Green and Co., New York, page 344, col. 2.

Chemical Abstracts, vol. 28 (1934), 2337$^5$, "Action of Hypochlorous Acid on Active 1-Methyl-$\Delta^3$-Cyclohexene."

Roberts, John D., and Caserio, Marjorie C., Basic Principles of Organic Chemistry, pages 176–7 (June 1964), W. A. Benjamin Co., New York.

Livingston, Robert S., and Bray, William C., The Catalytic Decomposition of Hydrogen Peroxide in an Acid Chlorine-Chloride Solution, The Journal of the American Chemical Society, vol. 47, August 1925, No. 8, pp. 2069–2082.

JOSEPH L. SCHOFER, Primary Examiner

R. S. BENJAMIN, Assistant Examiner

U.S. Cl. X.R.

260—82.1, 94.7 HA, 607 A, 617 R, 631 R, 634, 635 H, 648 R, 88.2 D, S